United States Patent
Askerov et al.

(10) Patent No.: US 12,443,761 B2
(45) Date of Patent: Oct. 14, 2025

(54) METHOD AND SYSTEM FOR FPGA-BASED ENCRYPTED VPN

(71) Applicant: ENQUANTUM LTD, Holon (IL)

(72) Inventors: Timur Askerov, Rishon LeZion (IL); Roman Vercetti, Holon (IL)

(73) Assignee: ENQUANTUM LTD, Holon (IL)

( * ) Notice: Subject to any disclaimer, the term of this patent is extended or adjusted under 35 U.S.C. 154(b) by 156 days.

(21) Appl. No.: 18/570,420

(22) PCT Filed: Jun. 22, 2022

(86) PCT No.: PCT/IL2022/050675
§ 371 (c)(1),
(2) Date: Dec. 14, 2023

(87) PCT Pub. No.: WO2022/269615
PCT Pub. Date: Dec. 29, 2022

(65) Prior Publication Data
US 2024/0296254 A1    Sep. 5, 2024

Related U.S. Application Data

(60) Provisional application No. 63/213,334, filed on Jun. 22, 2021.

(51) Int. Cl.
| | | |
|---|---|---|
| G06F 21/76 | (2013.01) | |
| G06F 21/60 | (2013.01) | |
| G06F 21/64 | (2013.01) | |
| H04L 9/06 | (2006.01) | |
| H04L 9/08 | (2006.01) | |

(52) U.S. Cl.
CPC ............ G06F 21/76 (2013.01); G06F 21/602 (2013.01); G06F 21/64 (2013.01)

(58) Field of Classification Search
CPC ........ G06F 21/76; G06F 21/602; G06F 21/64; H04L 9/0643; H04L 9/0894; H04L 9/0656
See application file for complete search history.

(56) References Cited

U.S. PATENT DOCUMENTS

| | | | |
|---|---|---|---|
| 8,363,833 B1 * | 1/2013 | Streicher | ............... H04L 9/0631 380/44 |
| 2005/0053074 A1 | 3/2005 | Wybenga et al. | |

(Continued)

OTHER PUBLICATIONS

PCT International Search Report for International Application No. PCT/IL2022/050675, mailed Sep. 2, 2022, 2pp.

(Continued)

*Primary Examiner* — Darren B Schwartz
(74) *Attorney, Agent, or Firm* — The Roy Gross Law Firm, LLC; Roy D. Gross

(57) ABSTRACT

A system and methods are provided for encrypting and decrypting data payloads, receiving an unencrypted data payload; generating a random seed value; generating in FPGA firmware an encryption hash key from seed parameters including the seed value, XORing the encryption hash key with the unencrypted data payload to generate an encrypted data payload; transmitting the encrypted data packet with the seed value and the encrypted data payload to a second FPGA that regenerates the hash key from the see parameters and XORing the hash key with the encrypted data payload to regenerate an unencrypted data payload.

18 Claims, 12 Drawing Sheets

Encryption/Decryption Sequence

(56) References Cited

U.S. PATENT DOCUMENTS

| | | | |
|---|---|---|---|
| 2010/0027783 A1* | 2/2010 | Yup | H04L 9/0643 |
| | | | 380/44 |
| 2013/0061039 A1 | 3/2013 | Ellis | |
| 2015/0351068 A1 | 12/2015 | Deleeuw et al. | |
| 2018/0184428 A1 | 6/2018 | Cariou et al. | |
| 2018/0205553 A1* | 7/2018 | Hoppert | H04L 9/3247 |

OTHER PUBLICATIONS

PCT Written Opinion for International Application No. PCT/IL2022/050675, mailed Sep. 2, 2022, 5pp.

* cited by examiner

Fig. 5　　　　Encryption/Decryption Sequence

Fig. 6                    Authentication and Activation

Channel Establishment

Channel Establishment

Data Plane – EID/Ingress field of input packet, for routing, billing counters and encryption/decryption Fig. 10   Control Plane – EID/Ingress field of input packet, for service and neighbor table update/read Ethernet Data Plane – Challenge/Response for Tamper Protection Event Generation

METHOD AND SYSTEM FOR FPGA-BASED ENCRYPTED VPN

CROSS REFERENCE TO RELATED APPLICATIONS

This application is the U.S. National Phase under 35 U.S.C. § 371 of International Application No. PCT/IL2022/050675, filed Jun. 22, 2022, which claims the benefit of U.S. Provisional Application No. 63/213,334, filed Jun. 22, 2021. Any and all applications for which a foreign or domestic priority claim is identified above and/or in the Application Data Sheet as filed with the present application are hereby incorporated by reference under 37 CFR 1.57.

FIELD OF THE INVENTION

The invention generally relates to encryption of network communications.

BACKGROUND

Cryptographic attacks continue to exploit increasingly powerful computers, and encryption algorithms consequently need to be increasingly more powerful. At the same time, users expect to be able to communicate at ever increasing speeds, meaning that encryption algorithms must execute more quickly. Methods and systems are therefore needed for achieving the dual goals of increased encryption security and improved encryption throughput. Improvements in current technology are especially needed in light of the potential for cryptographic attacks that may be implemented by quantum computing technologies.

SUMMARY

The present invention provides a system, methods, and apparatus for implementing secure communications, whereby layers of security protect the encryption algorithm from being revealed. The system described herein is characterized by cryptographic agility, in that quick and automated changes may be made to the cryptographic process on a scheduled basis and/or in response to suspicious events. Cryptographic changes are facilitated by a modular field programmable gate-array (FPGA) design. The system includes mechanisms for FPGA-based encryption-as-a-service, supporting secure virtual private network (VPN) communications (which may be implemented, for example, according to the various tunneling standards, such as VxLAN and GTP). The encryption method employed is a symmetric hash based cipher, considered as quantum resistant by modern cryptographers A method for encrypted communications provided by the present invention includes receiving at a first field programmable gate array (FPGA) and at a second FPGA, from an master controller (i.e., the "authentication" controller), respective encrypted bitstreams of encryption firmware and decrypting the encrypted bitstreams within the first and second FPGAs. The FPGAs then load the encryption firmware to programmable logic blocks (PLBs) of the first and second FPGAs. Subsequently, the first FPGA executes steps of: receiving an unencrypted data payload; generating a random seed value; generating a hash key from one or more seed parameters, including the seed value, by applying the encryption firmware, wherein a size (i.e., number of bits) of the hash key equals the size of the unencrypted data payload; XORing the hash key with the unencrypted data payload to generate an encrypted data payload; and assembling an encrypted data packet including the seed and the encrypted data payload and sending the encrypted data packet to the second FPGA. Subsequently, the second FPGA executes steps of: receiving the encrypted data packet with the seed and the encrypted data payload; generating the hash key from the parameters including the seed value, by applying the encryption firmware; XORing the hash key with the encrypted data payload to regenerate the unencrypted data payload; and delivering the unencrypted data payload to a target address.

A network communications channel between the first and second FPGAs is predefined, and the master controller delivers control messages to the first and second FPGAs specifying an encrypted channel ID (EID) value of the network communications channel. The seed parameters for generating the hash key may also include the EID value. The first FPGA may receive the unencrypted data payload together with an EID field, in which case the first FPGA may confirm that the EID field matches the EID value before generating the hash key. If the EID field does not match the EID value, the first FPGA may generate an error message instead of the hash key.

Sending the encrypted data packet to the second FPGA may include sending the encrypted data packet from an Ethernet port of the first FPGA. The network communications channel may be a virtual LAN channel. Typically, the first and second FPGAs operate in different local area network (LAN) domains.

The method may further include, before receiving the encrypted bitstreams, authenticating the first and the second FPGAs by the master controller by encrypted authentication handshakes.

The method may also include testing for tamper events at one or more of the first FPGA, the second FPGA and at associated respective computing devices in which the first and second FPGAs are installed, and notifying the master controller of such tamper events, wherein such tamper events include one or more of the following: FPGA debugging attempts, hardware changes to the computing device, or malformed input data packets. The method may include, additionally or alternatively, shutting down or resetting one or both of the first and second FPGAs when a tamper event is identified. A tamper event may include one or more of the following: an FPGA debugging attempt, a hardware change to an associated computing device, or a malformed input data packet.

Encryption may also include, additionally or alternatively, incrementing a billing counter upon sending the encrypted data packet to the second FPGA.

Also provided by the present invention is a system implementing the above method for encrypted communications that includes an master controller and two or more field programmable gate arrays (FPGAs). The two or more FPGAs are each configured to receive from the master controller an encrypted bitstream of encryption firmware, to decrypt the encryption firmware and to load the encryption firmware to programmable logic blocks (PLBs). The two or more FPGAs are further configured for encrypting data payloads by: receiving an unencrypted data payload; generating a random seed value; generating an encryption hash key from one or more seed parameters, including the seed value, by applying the encryption firmware, wherein a size of the hash key equals the size of the unencrypted data payload; XORing the encryption hash key with the unencrypted data payload to generate an encrypted data payload; assembling an encrypted data packet including the seed and the encrypted data payload and sending the encrypted data packet to a second of the at least two FPGAs. The two or more FPGAs are further configured for decrypting encrypted data payloads by: receiving from another of the at least two FPGAs an encrypted data packet with a seed value and an encrypted data payload; generating from the parameters including the seed value, by applying the encryption firmware, a decryption hash key; XORing the decryption hash key with the encrypted data payload to regenerate an unencrypted data payload; and delivering the unencrypted data payload to a target address.

BRIEF DESCRIPTION OF DRAWINGS

Reference will now be made, by way of example, to the accompanying drawings. Structural details of the invention are shown to provide a fundamental understanding of the invention, the description, taken with the drawings, making apparent to those skilled in the art how the several forms of the invention may be embodied in practice.

In the accompanying drawings.

DETAILED DESCRIPTION

Figure 1:
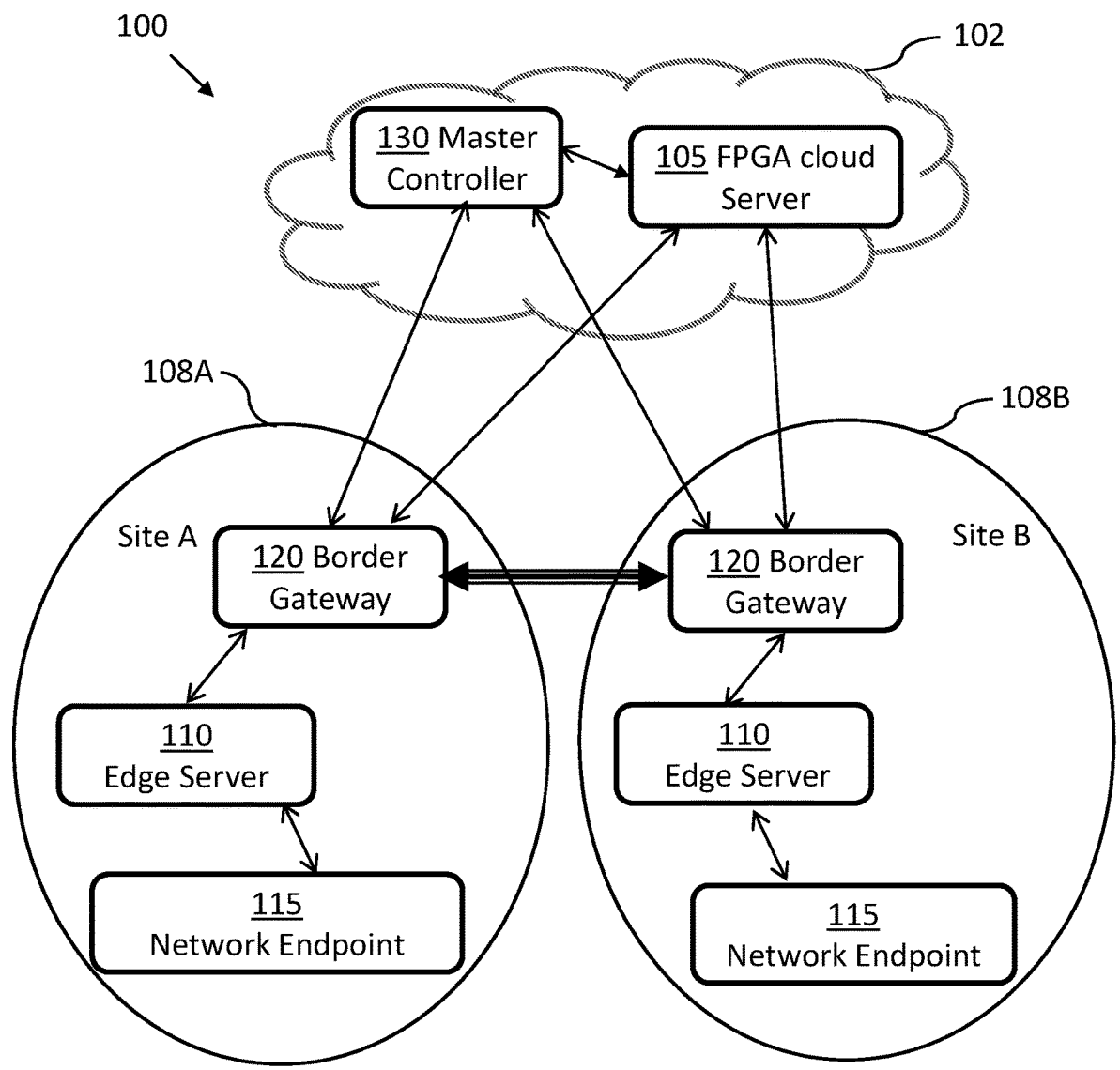
FIG. 1 is a schematic illustration of a system for secure communications, incorporating FPGA-based encryption-as-a-service.

It is to be understood that the invention and its application are not limited to the system and methods described below or to the arrangement of the components set forth or illustrated in the drawings, but are applicable to other embodiments that may be practiced or carried out in various ways.

FIG. 1 is a schematic illustration of a system 100, indicating several alternative and/or complementary computing devices that may send and receive encrypted data between each other. System 100 may include at least one cloud-based computer network 102, referred to hereinbelow as cloud 102, which is typically implemented by an FPGA cloud instance provider.

System 100 may also be a hybrid-cloud network, that is, the system may include one or more customer-managed computer networks, such as those indicated in the figure as site A (108A) and as site B (108B). Hereinbelow, a "site" typically refers to a domain of a VPN.

Hereinbelow, encryption and decryption of communications is typically performed by computing devices, such as personal computers and servers, that include or are attached to dedicated field programmable gate-array (FPGA) boards, which in turn include FPGAs (i.e., FPGA chips).

FPGAs provide means for achieving greater computing power in an efficient manner, and configurations for implementing encryption algorithms as FPGA firmware, particularly for secure signatures, have been described in the art. Cloud infrastructure providers may include FPGA instances among their offerings. Such FPGA instances may be adapted for encrypted communications. The present invention includes methods and systems for enhancing security and throughput of encrypted communications, based on encryption algorithms implemented as FPGA firmware.

Exemplary FPGA boards that may be configured to implement the present invention may include, for example, FPGA boards by Xilinx (e.g., Alveo™ and Artix™ Ultrascale+ FPGA boards). The computing devices may be "virtual" devices provided by cloud providers, which control cloud-based FPGAs, such as a cloud server 105. Other computing devices may also include customer site-based computing devices, indicated in the figure as edge servers 110 and endpoints 115, one or more of which may be located at customer-managed sites of system 100, such as sites A and B.

Any pair of the computing devices described above that communicate with each other by encrypted communications, as described herein, typically utilize the same FPGA firmware for implementing processes of data encryption and decryption. Executable modules of FPGA firmware may also perform other tasks related to secure data communications including authentication, activation, and tamper protection tasks. When located on separate LANs, the computing devices may communicate encrypted data between each other over encapsulated tunnels (such as VxLAN), as configured by network administrators. Traffic between LANs may be communicated by border gateways 120, as indicated in the figure.

In addition to executing FPGA-based routines, cloud servers 105, edge servers 110, endpoints 115, or other computing devices configured as described herein typically include software-implemented management routines executed on a CPU, collectively referred to hereinbelow as a software (SW) agent.

A master controller 130, which may be located in the cloud 102 or at any other location accessible to both site A and site B, manages various security mechanisms of the system 100, including activation and authentication of FPGAs of the various computing devices. The master controller 130, also referred to herein as a "authentication controller" may also log billing counters to charge users for encryption usage, and may track network events (such as tamper protection events) to hinder suspicious use. The master controller 130 may also have a backup instance that uses a shadow copy of a database of the master controller for failsafe operation. In some configurations, the cloud server 105 may serve as the master controller 130 backup, taking on tasks of the master controller in the event of master controller failure, including notifying all computing devices of the failure. A system administrator may configure a threshold of failure events that cause a master controller instance to be blacklisted.

It may be noted that the master controller 130 may also be configured as a cloud-based FPGA instance, such that some or all instructions implemented by the master controller are implemented by programmable logic firmware of an FPGA. (Regardless of where the master controller is located and how it is implemented, the configurations of the other devices in the system are essentially unchanged.)

In some network configurations, the network is configured such that the master controller 130 and the cloud server 105 are "visible" not only to each other but also to the edge servers 110, via tunnel protocols that pass data through the border gateways 120. Similarly, the edge servers at the separate sites A and B may be visible to each other over similar tunnel protocols. However, the network may not be configured to provide endpoints 115 with the same visibility of remote LANs. In such configurations, when an endpoint 115 communicates encrypted data to a computing device at a remote site (i.e., a site outside its own LAN), the endpoint 115 may perform the encryption and transmit the encrypted data to the edge appliance 110 of its own network. The edge appliance 110 may then relay the encrypted data to the correct target computing device without making any changes to the data payload (that is, without further encryption).

Figure 2:
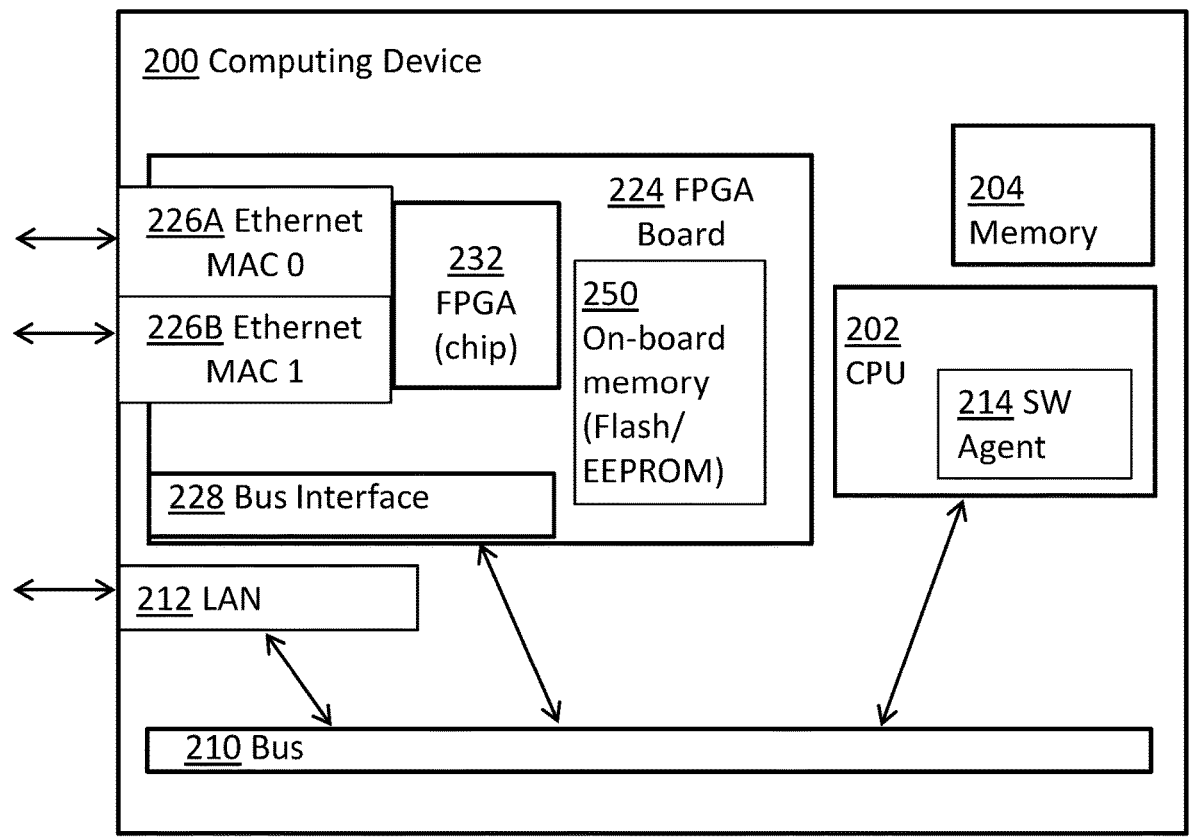
FIG. 2 is a schematic illustration of components of a computing device configured to send and to receive encrypted communications.

FIG. 2 is a schematic illustration of components of a computing device 200 configured to send and to receive encrypted communications. Such a computing device may be, for example, any of the cloud servers 105, edge servers 110, endpoints 115, or other computing devices configured as described above with respect to FIG. 1. Components of such computing devices generally include similar components as those shown with respect to computing device 200. As described above, such devices include one or more general purpose central processing units (CPUs) 202, and CPU-associated memory 204, as well as a system bus 210 and I/O local area network (LAN) port 212. In some implementations, the bus is a PCI-Express (PCIe) bus or a compatible M.2 interface.

A software (SW) agent 214 is typically configured to provide certain FPGA setup and maintenance functions, described further hereinbelow. The SW agent 214 may also provide an interface between an FPGA of the computing device and software applications that request encrypted communications.

An FPGA board 224 may be installed on the bus 210. Control messages from the SW agent 214 pass through the bus 210 (for example, as TLP messages), through a bus interface 228 to communicate with an FPGA (chip) 232 installed on the FPGA board 224. The FPGA firmware described above (including encryption firmware) is loaded to programmable logic blocks (PLBs) of the FPGA 232. Control messages sent from the master controller may instruct the FPGA 232 to perform tasks such as updating or reading tables of encryption, communication, and billing parameters. Control messages may also be sent from the FPGA 232 to the master controller 130 in case of any failure, or completed operation, or system monitoring that should be considered as an "event", such as a tamper protection event. Control messages may also reset the FPGA firmware according to event severity that was sent to the master controller from the FPGA.

In some configurations, data for encryption and decryption by the FPGA 232 may be received from and directed to I/O ports of the FPGA board 224, such as Ethernet ports 226A and 226B. For example, FPGA boards installed in edge servers 110 may communicate encrypted and decrypted data directly from the FPGA over Ethernet ports built into the FPGA boards. The FPGA board may also use the Ethernet ports to directly communicate management, authentication, and activation messages to the management controller 130, as well as communicating encrypted data to other computing devices.

Alternatively, some computing devices, such as the cloud server 105, may not have an option of direct Ethernet connection. In such implementations, communication of data for encryption and decryption may be communicated over the bus 210, to and from the SW agent 214, which in turn sends and receives the data over LAN port 212 (typically over the bus 210).

Programmable logic of the FPGA may be configured such that control and data messages can pass through either of the FPGA board's interfaces (i.e., bus or Ethernet) depending on the availability of such interfaces. Communications through the Ethernet interface ensure maximum throughput, avoiding bottlenecks at the computing device's CPU.

The endpoints 115 may include FPGA boards having an M.2 form factor for insertion in a compatible PCIe bus of a computing device such as a laptop. In such an endpoint device, both control and data messages may be transmitted from the FPGA to the SW agent, e.g., through an M.2 interface of the FPGA board, before being forwarded to the network. Consequently, in the endpoint 115, the SW agent may also handle control tasks of authentication, activation and communications establishment. Control messages, such as billing counter and service table messages, as described further hereinbelow, may be sent from the FPGA through the bus, to be forwarded by the SW agent running on the computing device's CPU. Cloud servers 105 may operate in a similar manner.

Figure 3:
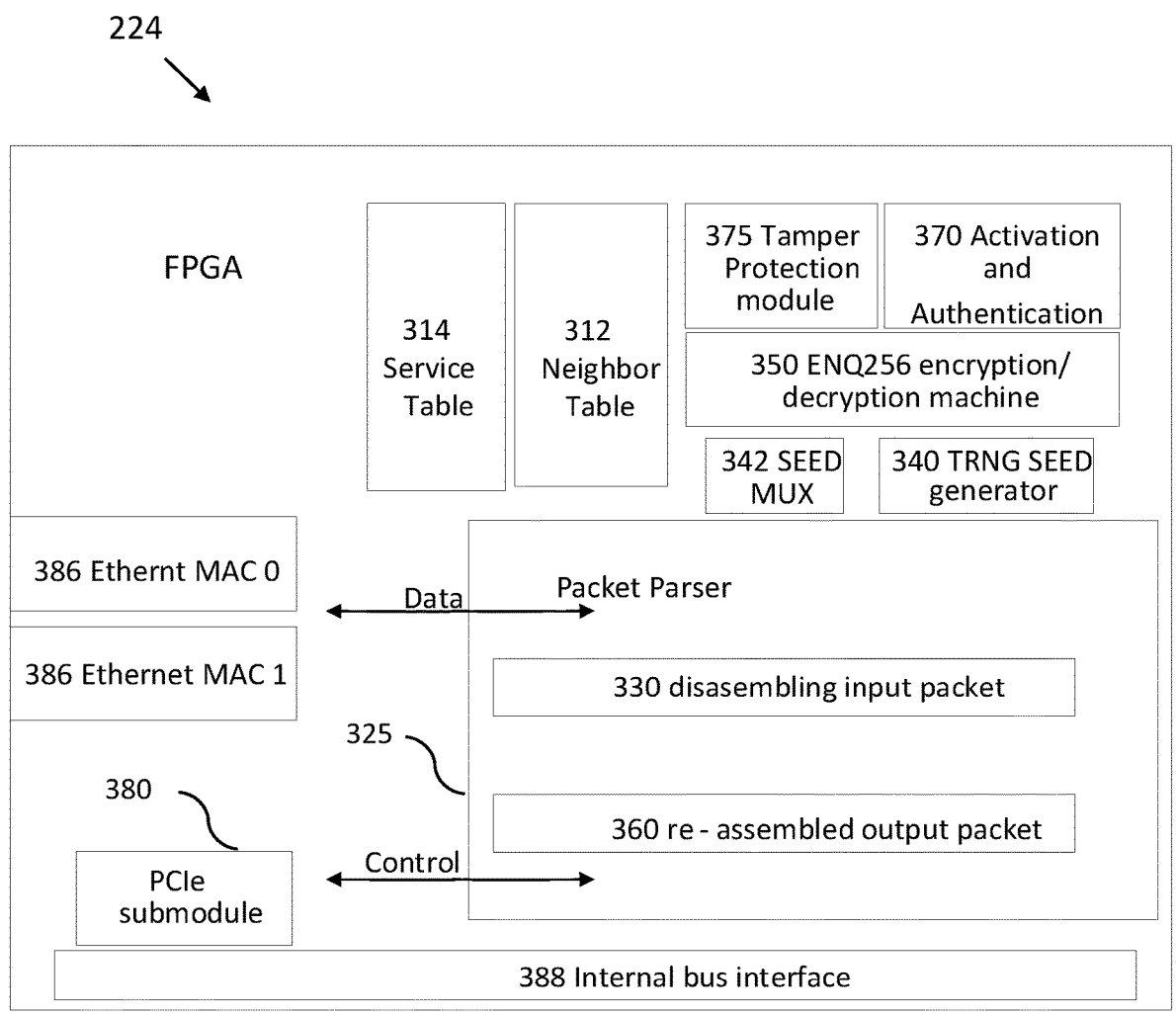
FIG. 3 is a schematic illustration of components of an FPGA, installed in a computing device configured to send and to receive encrypted communications.

FIG. 3 is a schematic illustration of some of the functions set as firmware (i.e., stored to programmable logic blocks, or PLBs) of the FPGA 232. As described above, the FPGA 232 is typically included in an integrated FPGA board, as described above.

The PLBs of FPGA 232 typically include block random access memory (BRAM) or ultra-RAM (URAM) that store parameters used by executable FPGA modules (which are also stored in the PLBs). The parameters may include two tables, indicated as a neighbor table 312 and a service table 314. Alternatively, in some implementations the neighbor table 312 and the service table 314 may be stored in other types of on-chip or on-board memory 250, such as high bandwidth memory (HBM), or QDRII or DDR4 memory. On board memory 250 may also include Flash and/or EEPROM memory for temporary storage as described below. Service and neighbor tables may be scaled to meet network requirements. For example, in some implementations there may be 8K-250K channels defined per service table, and up to 16, or more, neighbor ports per neighbor table. The neighbor table is configured to specify destination MAC addresses on the LAN of an FPGA, for each EID. The service table is used to specify an output (egress) FPGA I/O interface, as well as to support billing counters and "firewall" functions. "Firewall" functions include blocking encryption and communication of data packets that do not specify authorized (i.e., "registered") EID channels, as described below. The service table billing records may be read by the master controller multiple times per second (directly or via the SW agent, depending on a network configuration) and the records may be aggregated as a billing and network statistics database.

The FPGA also has executable modules installed to the FPGA PLBs. These modules may include the following: a packet parser 325, which includes an disassembling input parser 330 and an output packet re-assembler 360, a true random number generator (TRNG) seed generator 340, a seed multiplexor 342, an encryption/decryption engine 350, authentication and activation routines 370, a tamper protection module 375, and I/O interfaces, which may include Ethernet interfaces 386 and a bus interface 388, which is typically a PCIe (DMA, XDMA, or QDMA) interface (i.e., driven by a PCIe submodule 380). The Ethernet MAC and PCIe interfaces are typically standard FPGA IP modules that may be provided by an FPGA vender (e.g., Xilinx). The other modules are custom designed to provide the functions described hereinbelow.

Figure 4:
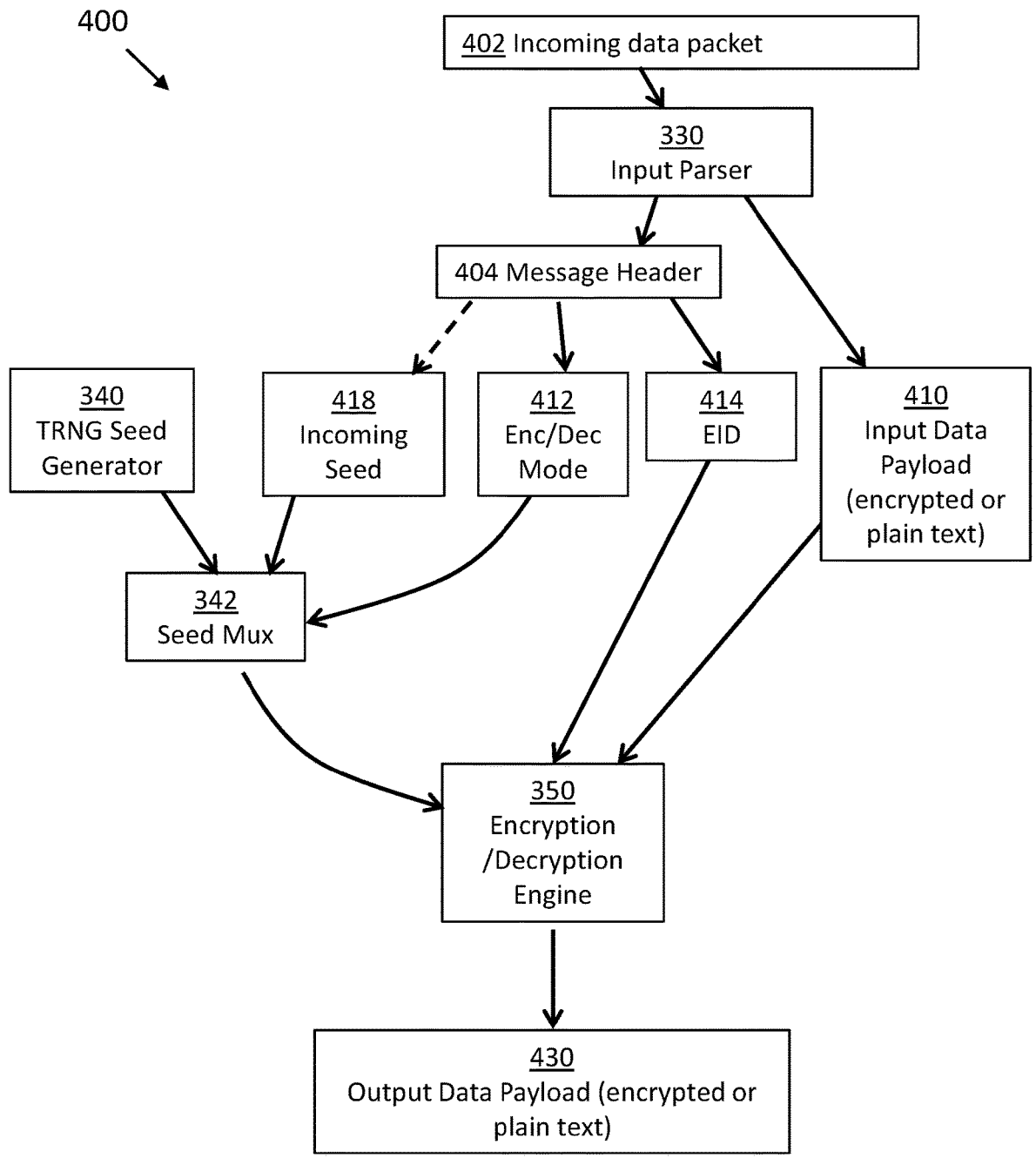
FIG. 4 is a schematic illustration of data flow during the encryption and decryption process performed by an FPGA supporting secure communications.

FIG. 4 is a schematic illustration of a process 400 of data flow during the encryption and decryption of data performed by the FPGA 232. The FPGA receives packets of data, such as a data packet 402. The input parser 330 extracts from the packet fields of a message header 404, as well as a data payload 410. The data payload may be either encrypted or unencrypted. (Unencrypted, or decrypted data may also be referred to herein as "plain text.") A mode field 412 of the header, as described further hereinbelow, specifies whether the payload is encrypted or unencrypted and whether the FPGA should encrypt or decrypt the payload (or simply forward it). The message header also typically includes an encrypted channel identifier (EID) 414. The EID defines a communications channel between an I/O port from which the FPGA will transmit encrypted data and an I/O port of a receiving FPGA that will decrypt the data.

If the mode indicates that the FPGA should decrypt an encrypted payload, the header also includes a "seed" value 418. If mode indicates that the FPGA should encrypt an unencrypted payload, there is no seed in the header and the FPGA generates a seed by the TRNG seed generator 340.

The seed multiplexor 342 then determines whether the generated seed or the incoming seed is passed to the encryption/decryption engine 350. The encryption/decryption engine then receives the seed, the EID, and the input data payload, and then applies the EID and the seed to either encrypt or decrypt the input data payload in order to generate an output data payload 430. The encryption/decryption engine 350 performs symmetric encryption; that is, the same input parameters for encryption are required to decrypt the resulting encrypted data. Herein, the encryption/decryption engine 350 may also be referred to simply as an encryption/decryption engine, or as encryption firmware.

Figure 5:
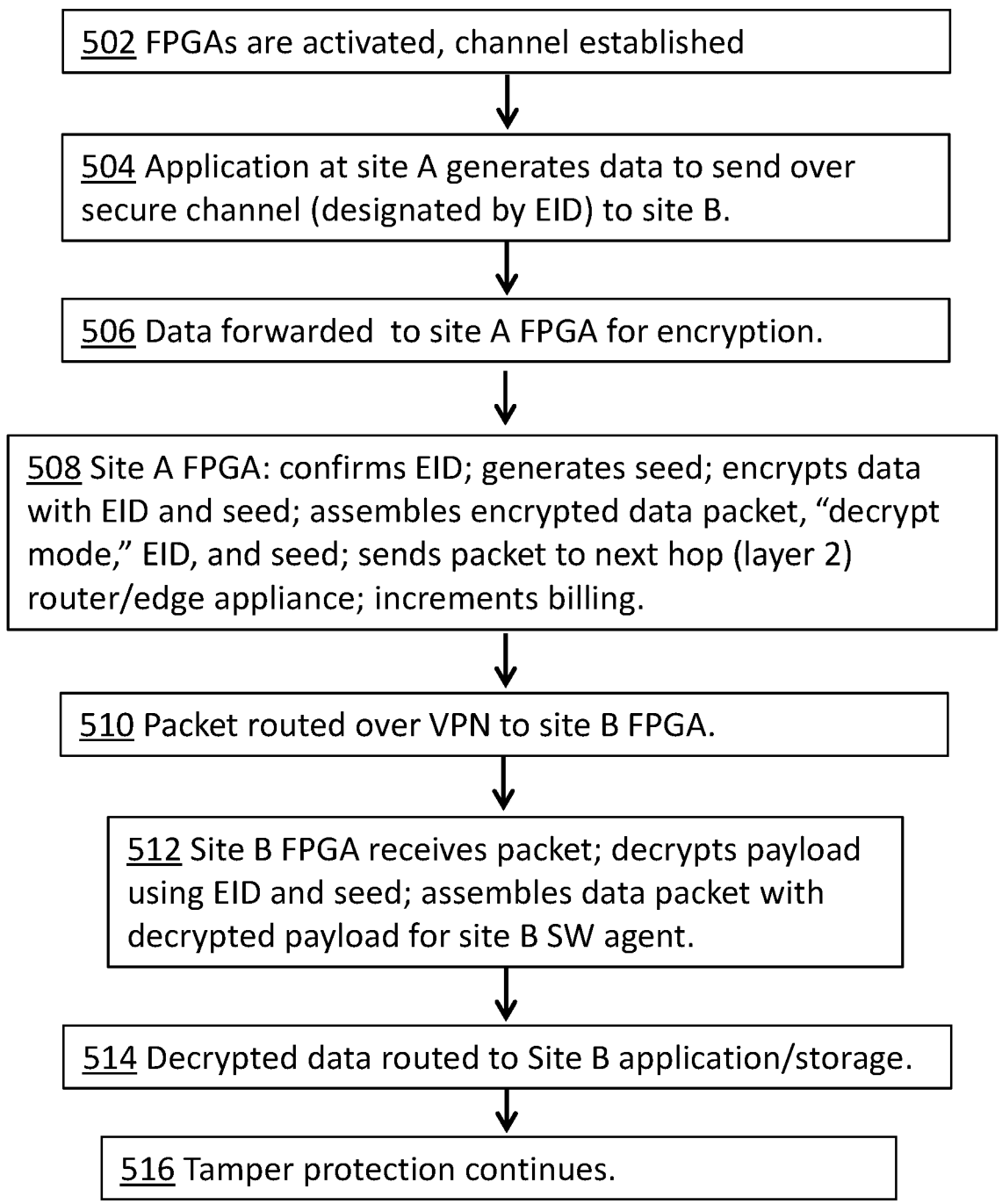
FIG. 5 is a flow chart of a process of encryption and decryption performed by the system.

FIG. 5 is a flow chart of a process 500 of encryption and decryption, performed by a system supporting secure communications. Encrypted communications require execution of an initial step 502, which includes configuration of the network, including authentication and activation of FPGAs that will encrypt and decrypt designated data communicated from site A to site B. The processes of authentication and activation are described below in more detail with respect to FIG. 6. The initial step 502 also requires validation of the network communications channel (typically a VPN configuration) for communicated encrypted data from the site A FPGA to the site B FPGA, as described in greater detail below with respect to FIG. 7.

During step 502, the FPGAs and the master controller are configured to designate the secure channel by an EID value.

The encrypted communications process then proceeds at a step 504, at which an application executing at site A, typically on a computing device such as an endpoint or edge server, as described above, generates data to send over the secure channel, designated by the EID, to a target address, such as an application at a site B.

At a step 506, the data for encryption is passed as an unencrypted data payload in an unencrypted data packet to a designated site A FPGA for encryption and transmission. A header of the unencrypted data packet indicates the EID and the encryption mode, as described above.

At a step 508, several actions are executed by firmware of the site A FPGA. The incoming data packet is parsed to a header and data payload. The encryption/decryption mode set in the header is applied to the seed multiplexor and to the encryption/decryption engine to set whether the data packet is to be encrypted or decrypted. The EID value in the header is compared with EID values stored in the service table 314 of the FPGA, described above with respect to FIG. 3. The service table is typically transmitted to the FPGA from the master controller during the channel establishment process described below.

Because the data payload is to be encrypted, a seed value is not provided in the header (as is the case with a header of an encrypted data packet). A true random seed value is therefore generated by the FPGA seed generator 340, described above. The generated seed value together with the EID value are then processed by the encryption/decryption engine to generate a hashed key value. The hashed key is generated to be the same length as the unencrypted data payload, so that the hash key can be XORed with the unencrypted data payload to generate an encrypted data payload, thereby performing a type of "one-time pad" encryption of the data payload.

In an exemplary implementation, the fields described above are set as follows. The seed has a 256-bit value, and the EID has a 28-bit value. The data payload has 1856 bits. The "mode bit is "0" if the payload is to be encrypted and "1" if encrypted and is to be decrypted. After decryption, the mode bit is returned to "0" and egressed (i.e., output) to a final target address (e.g., application or other destination).

The encryption/decryption engine performs several steps in generate the hash key. As opposed to common encryption methods that rely on secret keys being processed by known algorithms, systems implementing the process described herein maintain security of encrypted data by maintaining the hashing algorithms themselves as "secrets." The secrecy of the algorithms is maintained through the process of generating variations to the algorithm, of communicating a new variation of the algorithm from the master controller to the FPGAs, and by keep-alive, tamper protection protocols, as described further hereinbelow.

The hashing algorithm converts the seed and EID values to two-dimensional matrices, which are multiplied by transpose matrices $A^T$ of the encryption/decryption engine. Rows of each matrix may also be shifted right and/or left before multiplication, and rows of the matrices may be XORed with each other. These operations, like the transpose matrices $A^T$, are determined by parameters that are included with the encryption/decryption engine. To summarize, types of matrix operations set by the hashing algorithm may be represented by the following equations, which show examples of matrix row shifts, matrix multiplications, and XORing of matrix rows:

$$\left( \begin{pmatrix} SEED << EID \\ \vdots & \vdots & \vdots \\ SEED >> EID \end{pmatrix} X(A^T) XOR(EID) X(A^T) \right)$$

=> row0 XOR row1 . . . row26 XOR row27
=> 256-bit key segment
Where,
  EID - user ID value
  SEED - a clue for the key transferred in a header with the data
  $A^T$ - transpose matrix The SEED matrix is built from shifted left/right SEED values, which have a size of EID×SEED bits. By way of example, assume EID is a 4-bit length value, instead of 32 bits as in the design above, such that the SEED would be 32 bits instead of 256 bits. For example, assume the following values:

> EID = 5 (decimal), 0101 (binary)
> SEED = 458963254 (dec), 1B5B3936 (hex),
> 00011011010110110011100100110110 (bin)

Cyclic shift left the SEED for EID times (or other more complex but similar operations, based on the EID value), gives:

> SEED<<EID = 1B5B3936 <<5 = 6B6726C3 (hex),
> 01101011011001110010011011000011 (bin)

The SEED matrix (4×32 bit) after the shifting operations should look like as follows, in hexadecimal base:

> 6 B 6 7 2 6 C 3
> B 0 D A D 9 C 9
> 6 B 6 7 2 6 C 3
> B 0 D A D 9 C 9

In binary base, the SEED matrix would appear as follows:

> 0110 1011 0110 0111 0010 0110 1100 0011
> 1011 0000 1101 1010 1101 1001 1100 1001
> 0110 1011 0110 0111 0010 0110 1100 0011
> 1011 0000 1101 1010 1101 1001 1100 1001

The SEED matrix (32×4 bits) after multiplying by the transpose matrix is XORed with the EID vector (i.e., value 5):

> | 1 0 1 0 |
> | 0 1 0 1 |
> | 1 1 1 1 |
> | 1 0 1 0 |
> | 0 1 0 1 |
> | 0 0 0 0 |
> | 0 1 0 1 |
> | 0 1 0 1 |
> | 1 0 1 0 |
> | 1 1 1 1 |
> | 0 1 0 1 |
> | 1 0 1 0 |
> | 1 0 1 0 |
> | 0 1 0 1 | XOR (0101)
> | 1 1 1 1 |
> | 1 0 1 0 |
> | 1 0 1 0 |
> | 1 0 1 0 |
> | 0 1 0 1 |
> | 1 0 1 0 |
> | 1 0 1 0 |
> | 0 1 0 1 |
> | 0 1 0 1 |
> | 1 0 1 0 |
> | 1 1 1 1 |
> | 1 1 1 1 |
> | 0 0 0 0 |
> | 0 0 0 0 |
> | 1 0 1 0 |
> | 0 0 0 0 |
> | 0 1 0 1 |
> | 1 1 1 1 |

The result is:

> 1001 0011 1001 1011 1101 1011 0000 1101 = row 0
> 0011 1100 1001 1011 1001 1000 0010 1001 = row 1
> 1001 0011 1001 1011 1101 1011 0000 1101 = row 2
> 0011 1100 1001 1011 1000 1000 0010 1001 = row 3

The rows may then be cycle shifted by a number of shifts according to a value based on the EID, or other similar operation. The matrix rows can be cycle shifted left or right by the value of the EID or by values represented by mixed EID fragments that may be concatenated. For example, shifts may be by the following patterns:

> Row 0 >> (EID + 0)
> Row 1 >> (EID + 1)
> Row 2 >> (EID + 2)
> Row 3 >> (EID + 3)

In our example, EID=5, hence:

> 0110 1100 1001 1100 1101 1110 1101 1000
> 1010 0100 1111 0010 0110 1110 0110 0000
> 0001 1011 0010 0111 0011 0111 1011 0110
> 0010 1001 0011 1100 1001 1011 1000 1000

The 32-bit key segment may then be based on the result of XORing all the rows:

> 1111 1010 0111 0101 0001 1100 1000 0110

The key may be assembled by concatenation (or by a more complex algorithm) of the 32-bit segments (or 256-bit key segment in the original design), according to the payload size.

After performing these types of matrix operations, according to the parameters of the encryption/decryption engine, the output of the one or many matrices may be concatenated into one long vector, such as a 2048-bit vector. The hash key may then be "cut" from the output vector to match the size of the data payload (e.g., to an 1856-bit key). As described above, the hash key is then XORed with the data payload. The FPGA then assembles an output data packet, including the encrypted data payload, and including a header, such as an Ethernet header for routing of the encrypted data packet to its destination (typically by a preset network configuration, such as a VxLAN configuration). Hereinbelow, the output data packet generated as described above is also referred to as an ENQ256 data packet, and the process is referred to as ENQ256 encryption.

Before transmitting the encrypted packet, the FPGA may also increment a billing counter, which may be applied by system administrators for billing purposes, as described further hereinbelow.

At a step 510, the FPGA at site A transmits the encrypted data packet to site B. At a step 512, the encryption process described above is repeated in order to decrypt the encrypted data payload. That is, the received seed and EID values (after the EID value is confirmed as valid, based on the service table) are applied to the hashing function of the encryption/decryption engine on the site B FPGA in order to re-generate the hashed key. The hash key is then XORed with the encrypted data payload to generate the decrypted data payload.

At a step 514, the decrypted data is routed, according to parameters typically included in higher layer encapsulation in the data payload, to a target address (which may be an interactive application, such as a web interface, or a driver for memory storage, or any other software routine configured to receive communications).

In parallel with the steps of process 500, the FPGA also responds to the keep-alive messages issued by the master controller at regular intervals, while also recording and transmitting data related to tamper events, described further hereinbelow (e.g., step 616 of process 600). Tamper events include, for example, events related to invalid EID or seed values. Before generating the hash key, the existence of the EID value in the service table is confirmed. This is a form of "whitelist" verification of input data packets. If the EID does not exist in the service table, an "event" message, indicating a possible tampering attempt, may be sent from the FPGA to the master controller. The message may also include the entire contents of the data packet for evaluation of possible tampering, i.e., a possible cryptographic attack. The FPGA also checks the seed value for patterns that would indicate that the seed was not generated by a "true" random number generator. Such an indication may also mean that the input data packet is part of a possible cryptographic attack (for example, as part of an FPGA debugging attempt). Such an event may also generate a respective event message that is sent to the master controller. The master controller may be configured to take appropriate actions, such as sending the FPGA a message to be reset if a certain threshold of tampering events are logged. The FPGA may also be configured to reset itself if a threshold of such events occurs.

Encrypted and decrypted data packets may have fields having formats such as those shown below (where the fields preceding the data payload field are considered "header fields):

seed cannot be increased without reducing protocol "goodput." Consequently, to increase the mathematical complexity of the cipher, the EID value is added to the seed as a parameter in the KEY generation process.

Data Payload—either encrypted or unencrypted, as described above.

FCS—frame check sequence, typically a cyclic redundancy check (CRC).

When an output data packet is formed by the encrypting FPGA, as described above, destination MAC (DMAC) and source MAC (SMAC) addresses are determined by a relationship set in the neighbor table between the EID and the DMAC, and by a relationship set in the service table between the SMAC and output (egress) port configuration. The EtherType value stays the same as in the input data packet, and the EID value stays the same, while the ingress field changes according to the Service table configuration.

Figure 6:
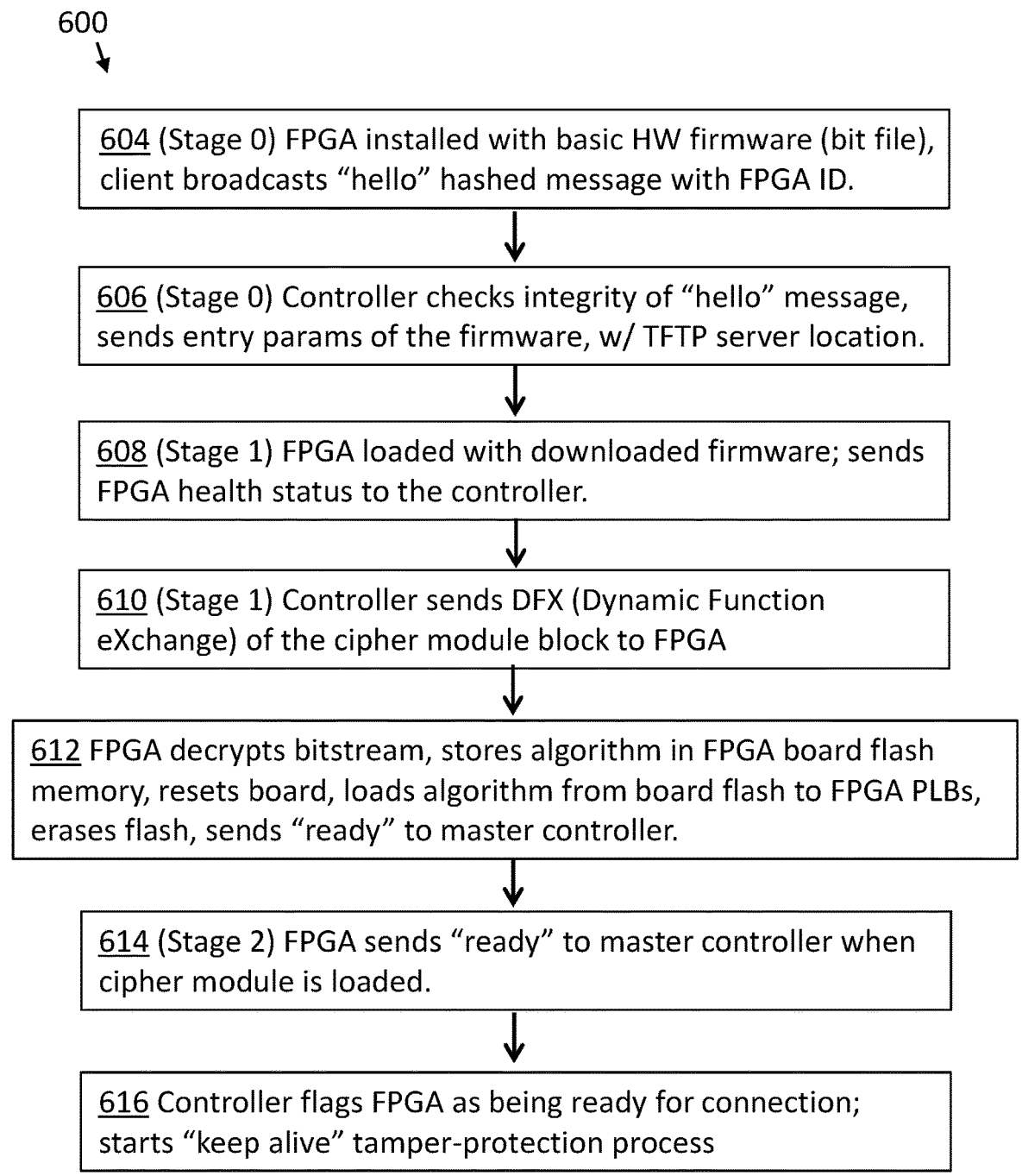
FIG. 6 is a flow chart of a process of authentication and activation of devices of the system.

FIG. 6 is a flow chart of a process 600 of authentication and activation "handshakes" between FPGAs and the master controller, for "bootstrapping" the firmware loaded to the FPGAs. The two stages of authentication and then activation ensure that FPGA will have a current, operable version of firmware only after being authenticated by the master controller. That is, the process establishes a "trust relationship" between an FPGA instance and the master controller. In addition, the activation process is also separated into two stages, permitting greater agility in replacing the encryption/decryption engine, as described further hereinbelow.

At a first step 604, an FPGA board with an "installation" firmware version is installed on a computing device (such as the computing device 200 described above with respect to FIG. 2). A software agent on the computing device is configured to read an FPGA ID from the installation firmware and to send the FPGA ID and other identifying information to the master controller as a "stage 0" request

| DMAC - | SMAC - | Ethertype - | ENQtype - | SEED - | DATA payload - | FCS - |
|---|---|---|---|---|---|---|
| 5 bytes | 6 bytes | 2 bytes | 1 byte | 32 bytes | 232 bytes | 4 bytes |

As indicated, fields of such an exemplary data packet are as follows:

DMAC—Destination MAC address on LAN.

SMAC—Source MAC address (Ethernet port of FPGA or of computing device).

EtherType—a two-octet field used in standard Ethernet headers to indicate that a given protocol is to be used for encapsulating the data payload. The EtherType may be used by the receiving end of a data link layer to determine how to process the payload. For new protocols, such as the one described herein, a new value may be assigned by the Internet Assigned Numbers Authority (IANA), which would assign a value not registered to other known EtherType protocols.

ENQtype—defines a type of data packet message. Examples are indicated in Appendix 1, below.

EID, ingress port—The EID value indicates an encrypted channel (i.e., "tunnel") ID, which is used for recording billing in the service table, as described further hereinbelow. The ingress port value represents a row in the neighbor table 312, as described further hereinbelow. which indicates a destination MAC to be inserted into an output packet.

SEED—The seed field is sent with an encrypted data payload, to be used for decryption. In order to maintain the size of the standard Ethernet header, the size of the message (also referred to as a "hello" message). The message may include a header and a hashed message, generated by the software agent using a hashed function set in logic of the FPGA. The message may also include hardware ID, such as a PCI-ID of the FPGA board, and a health status of the computing device and FPGA. Health status can include PCIe status, Ethernet port status, memory status, temperature status, JTAG connection status and additional parameters noted below. It should be noted that the hardware ID is typically included in the hash codes used for subsequent "keep-alive" communications.

The stage 0 request ("hello") message is routed by a preset network configuration to the master controller.

At a next step 606, the master controller records the identification provided in the stage 0 request message. After confirming the availability of a pre-registered license (typically linked to the PCI-ID), the master controller replies by sending a response message to the software agent, which includes a pointer to a location from which the computing device can download stage 1 firmware.

At a step 608, the master controller confirms the identity of the SW agent and instructs the SW agent to pull the stage 1 firmware, typically from a file storage server service. The stage 1 firmware is typically encrypted, for example, by Xilinx standard encryption (IEEE-1735-2014) and/or by a proprietary bitstream cipher included in the stage 0 firmware. The SW agent flashes the stage 1 firmware to the FPGA flash storage. The software agent then typically reboots the FPGA, as stage 1 firmware is typically added to the static configuration of the FPGA, which prevent hacking of the code.

The stage 1 firmware typically includes fully operational functionality for receiving and generating messages, but lacks the encryption/decryption engine that is transmitted as stage 2 firmware. Functionality of the stage 1 firmware may include, for example: Value-added Network software and routing, switching and SmartNIC functionality. By separating the stage 1 firmware from the stage 2 encryption/decryption engine firmware, the encryption/decryption engine is a smaller package, which facilitates fast replacement of the encryption/decryption engine whenever appropriate to address security concerns. The stage 2 encryption/decryption engine firmware is typically installed dynamically, whereas the stage 1 firmware is installed statically. As the stage 1 firmware typically maintains a network connection, the separation of the activation stages of the stage 1 and stage 2 firmware means that a network connection managed by the stage 1 firmware may be maintained while a new stage 2 encryption/decryption engine is being installed. Thus, new stage 2 encryption/decryption engines can be installed "on-the-fly."

At a step 610, following the mutual authentication of the master controller and the FPGA, subsequent "health status" handshake may be conducted between the master controller and the FPGA as part of the boot process. The master controller may request the health status of the FPGA, and the FPGA returns one or more details of a "status report." These details may include: PCIe bus status (including link speed and configuration), NVME status (including link speed and configuration), ETH ports status (e.g., link and speed), MIG status (for each DDR DIMM; for DDR4 may include temperature), temperature status, I2C state (if signal detected), JTAG connection status, and hardware ID of the FPGA (EPROM). After sending the report, the FPGA then receives an "approved entry" message from the master controller, indicating the loadable FPGA firmware (i.e., stage 2 firmware with the encryption/decryption engine) will be sent as a new dynamic bitstream.

At a step 612, the master controller sends the FPGA instruction and location of an encrypted bitstream of the stage 2 firmware. The encryption/decryption engine may be loaded into the FPGA using the Xilinx dynamic reconfiguration feature, or similar reconfiguration mechanism. The stage 2 firmware includes the encryption/decryption engine, which includes the algorithm parameters described above (e.g., transpose matrices, shift parameters, etc.).

At a step 614, the FPGA decrypts the received bitstream of stage 2 firmware and stores the decrypted bitstream, typically in flash memory of the FPGA board. The FPGA PLBs are loaded with the code from the flash memory and the flash memory is then erased. A "ready" message is sent to the master controller from the FPGA (i.e., from the activation module of the FPGA) to indicate that the FPGA can participate in encrypted communications.

At a step 616, the master controller begins a process of sending "keep-alive" tamper protection messages to the FPGA, as well as to the associated devices of the FPGA board and of the computing device that hosts the FPGA board. The FPGA responds to these messages (from the tamper protection module) to confirm that the FPGA is operating as designed, and that the FPGA and the associated devices are not receiving signals or messages that could indicate a cyber-attack. The keep-alive messages and responses (together referred to herein as "handshakes") may include encrypted hash challenge messages, which may be encrypted by the same or similar hash processes as described above for encrypting data payloads. The keep-alive messages may be sent to the FPGA and associated devices from the master controller, for example, every 100 ms. Such keep-alive messages continue until the FPGA is powered down. In response to the keep-alive messages, the FPGA and associated devices send the master controller send messages confirming that no suspicious events have occurred, or alternatively, sending tamper updates regarding various suspicious, "tamper" events. Some of these updates may refer to the following types of events.

A tamper event may be logged by a SW agent when changes are made to physical interfaces of the computing device, such as the PCIe CPU configuration.

A tamper event may be logged by an FPGA when a debugging attempt is made from interfaces such as JTAG or I2C, or when a connection to the FPGA is made via an external cable such as that used by the USB-JTAG interface. The system may also be configured to shut down or reset the FPGA in response to such an event. After reset, new FPGA firmware may be delivered to the FPGA.

A tamper event may be logged when an influx of incompatible traffic, such as non-configured EIDs (or blacklisted EIDs) or unexpected control signals, is recorded. Incompatible traffic may also include malformed data packets, that is, data packets with header fields that do not conform to expected values. If the number of such events passes a threshold or if such traffic matches certain "signature" traits, the master controller may be configured to notify the SW agent of the indicated computing device to replace the encryption/decryption engine by dynamic reconfiguration (as described above with respect to step 612) or to shut down or reset the FPGA, depending on the severity of the security policy. If the encryption/decryption engine of the indicated computing device is replaced with a new version, the master controller is configured to also notify SW agents of computing devices that share channels with the indicated computing device that they must also replace their encryption/decryption engines to the new version.

Changes to the serial number of the SPI-flash storage medium on the FPGA card may also be recorded as a tamper event and lead to a shut down or reset of the FPGA, or to replacement of the encryption/decryption engine.

A tamper event may also be logged by the master controller if a SW agent or FPGA that is polled by keep-alive signals does not respond within a threshold period of time, such as a few seconds. In such a case, the master controller may issue a command for a channel to be shut down or reset, meaning that an FPGA that is operational on a channel also ceases communications.

In response to such potential tamper events, the master controller may also signal an alert to a system administrator.

To summarize the stages:

Stage 0 (default image): the FPGA can identify itself as an authorized device and perform upgrades.

Stage 1 (customer Image): the FPGA can perform health checks and network functions.

Stage 2 (Crypto Image/Dynamically reconfigurable): the FPGA can identify itself via ENQ256 messages and perform cryptographic operations.

It is understood that the same process is performed by the site B computing device.

Figure 7:
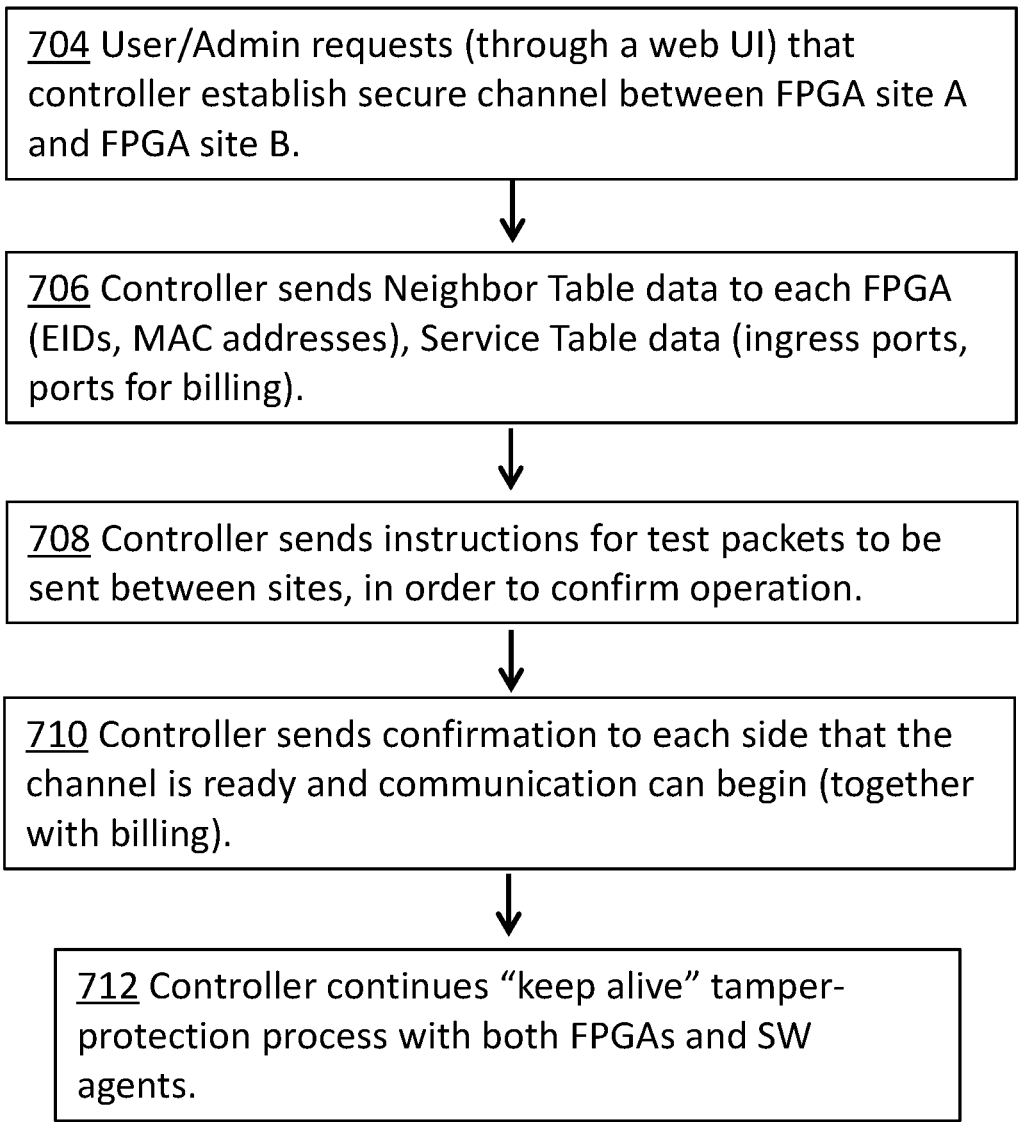
FIGS. 7 and 8 are flow charts of a process of establishing a secure communications channel between computing devices of the system.
Figure 8:
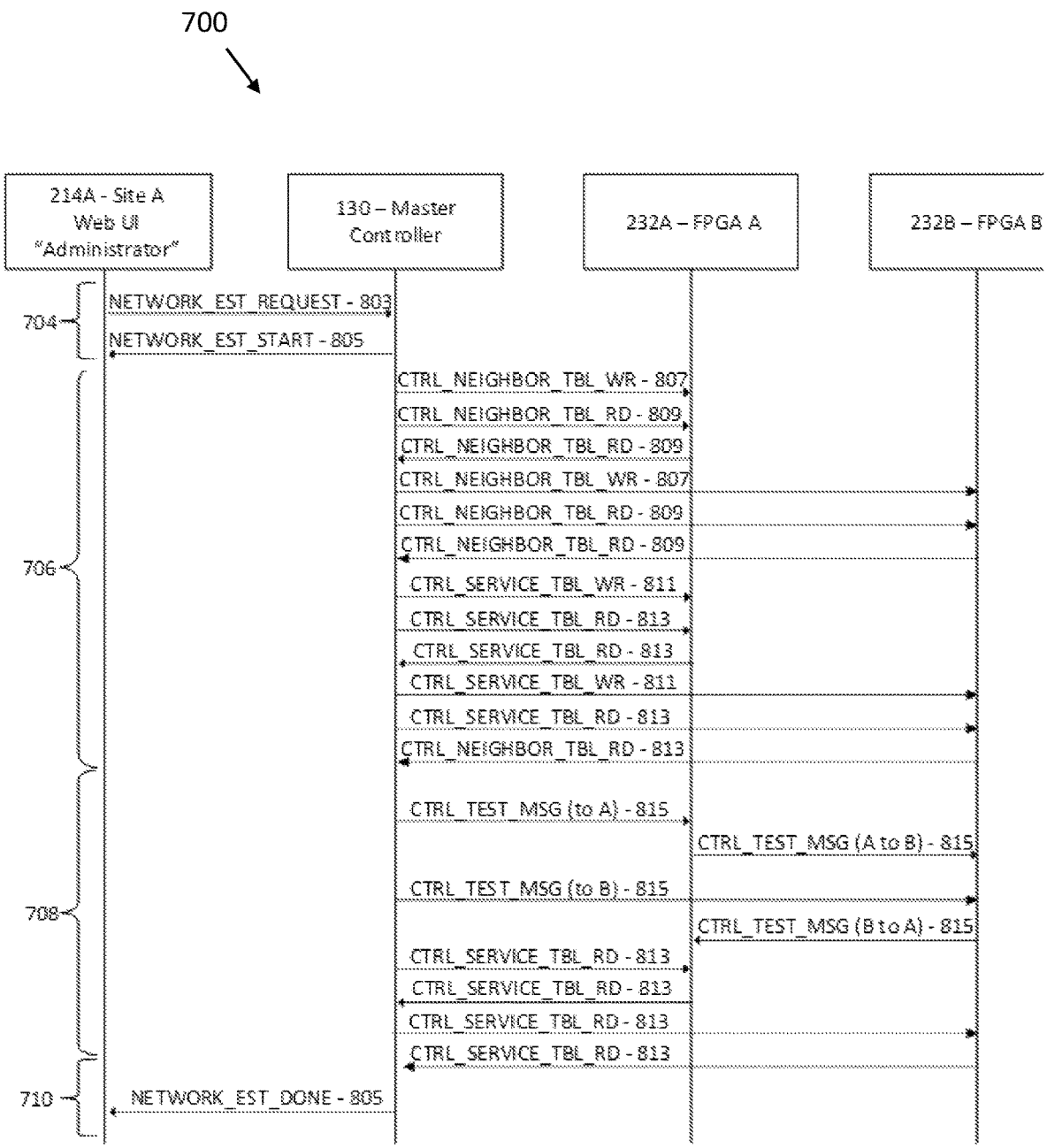

FIGS. 7 and 8 are flow charts of a process 700 by which the master controller 130 (i.e., authentication controller) confirms that a secure communications channel is operational between computing devices of the system 100. After FPGAs at site A and at site B are authenticated and activated by the process 600 described above, a user or system administration (depending on the system configuration) may request that a "channel" between the pair of FPGAs be established, as indicated by step 704 of FIG. 7. Such a request is typically routed through a web user interface (UI).

Next, at a step 706, the master controller sends neighbor table data to each FPGA, providing an EID of the channel to be established between the pair of FPGAS, including the MAC addresses that each FPGA communicates with on its own LAN. The master controller also sends service table data to each FPGA. The service table indicates ingress ports of the FPGAs, which are used both for routing communications and for billing encryption or traffic processing jobs. Typically, every time a packet is encrypted, the FPGA performing the encryption increments a billing counter in the service table defined for the given EID. (It is to be understood that the EID values in the neighbor and service tables are considered to be "registered" EID values.)

At a step 708, the master controller sends instructions for the transmission of test packets to be sent between sites, in order to confirm operation of the channel between the two. Steps 706 and 708 are shown in more detail in FIG. 8, described below.

At a step 710, the master controller sends a confirmation to an administrator interface that the channel is ready (i.e., has been established) and that communications between the pair of FPGAs can begin, together with billing.

In parallel with the above steps of process, the master controller continues to issue "keep-alive" messages ensuring a tamper-protection process with both FPGAs and SW agents, described above as step 516.

Above steps 704-710 are shown in more detail in FIG. 8, which shows the message flow during channel establishment, with messages being communicated between the master controller 130 and a pair of FPGAs 232A and 232B at respective sites A and B. The message flow that is shown reflects message flow for FPGAs that have direct Ethernet connections (as described above with respect to edge servers 110), such that message flows for steps 706 and 708 may be transmitted between the master controller and the FPGAs without the involvement of the SW agents. For cloud servers 105 and endpoints 115, communications to the FPGAs may be passed through the SW Agents of their respective computing devices. As with the last step of process 500, process 700 then continues FIGS. 9-14 are schematic illustrations of data flows related to referencing the neighbor and service tables of the FPGAs.

Figure 9:
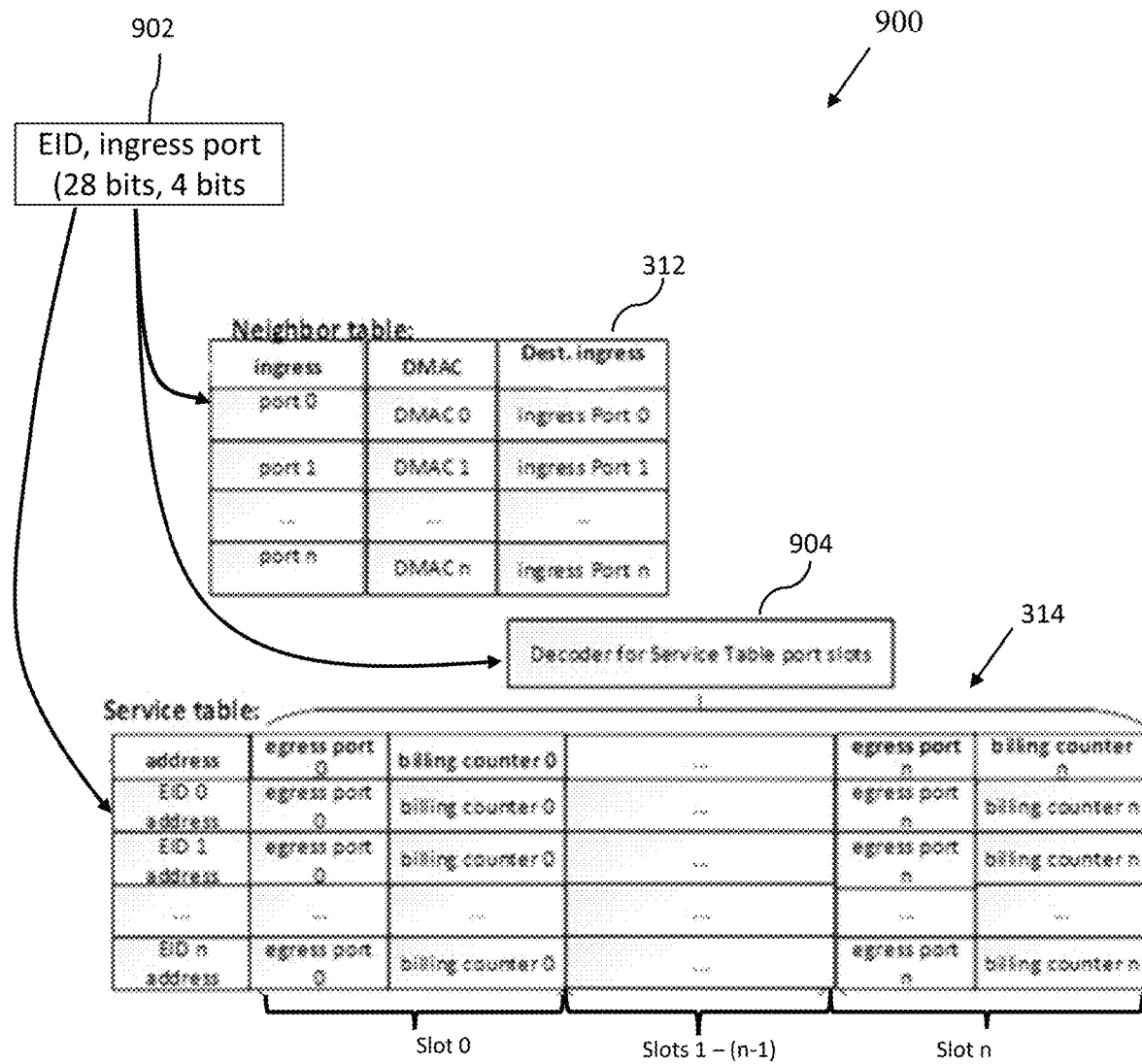
FIGS. 9-12 are schematic illustrations of data flows for referencing tables used by the system for secure communications.

FIG. 9 shows a relationship 900 between an EID/ingress port field 902 of a typical data packet received over an encrypted tunnel. The EID value corresponds to a row of the service table 314. Every time a packet with such an EID value passes through the system, a billing counter of a slot corresponding to the EID, according to an ingress value, is incremented by one in the service table. Typically, each slot represents a different Ethernet port of the FPGA. (A decoder 904 directs an input query, with the EID and ingress values, to the proper slot). The ingress value also indicates from which egress port the output data packet is transmitted.

The ingress port value of the EID/ingress port field indicates an ingress port value of a row of the neighbor table 312. Each neighbor table row provides a correspondence between an ingress port field and a DMAC value to be added to an output data packet. The source MAC of the output data packet is correlated to the egress port that is taken from the service table. These steps are typically performed by the parser module.

The service table, when used in PCIe only mode, can point to a specific application on the originating computing device, based on the EID value, as each application on either side of a channel may use the EID value for Layer 5 application layer communications (of the OSI model). For example, an EID value of 1000 in the service table may indicate a channel of communication between a browser application running on a computing device in site A that communicates to a web server running on a computing device at site B. An EID value of 1001 may indicate a channel of communication between an SSH session running in site A that communicates to a remote server at site B.

Figure 10:
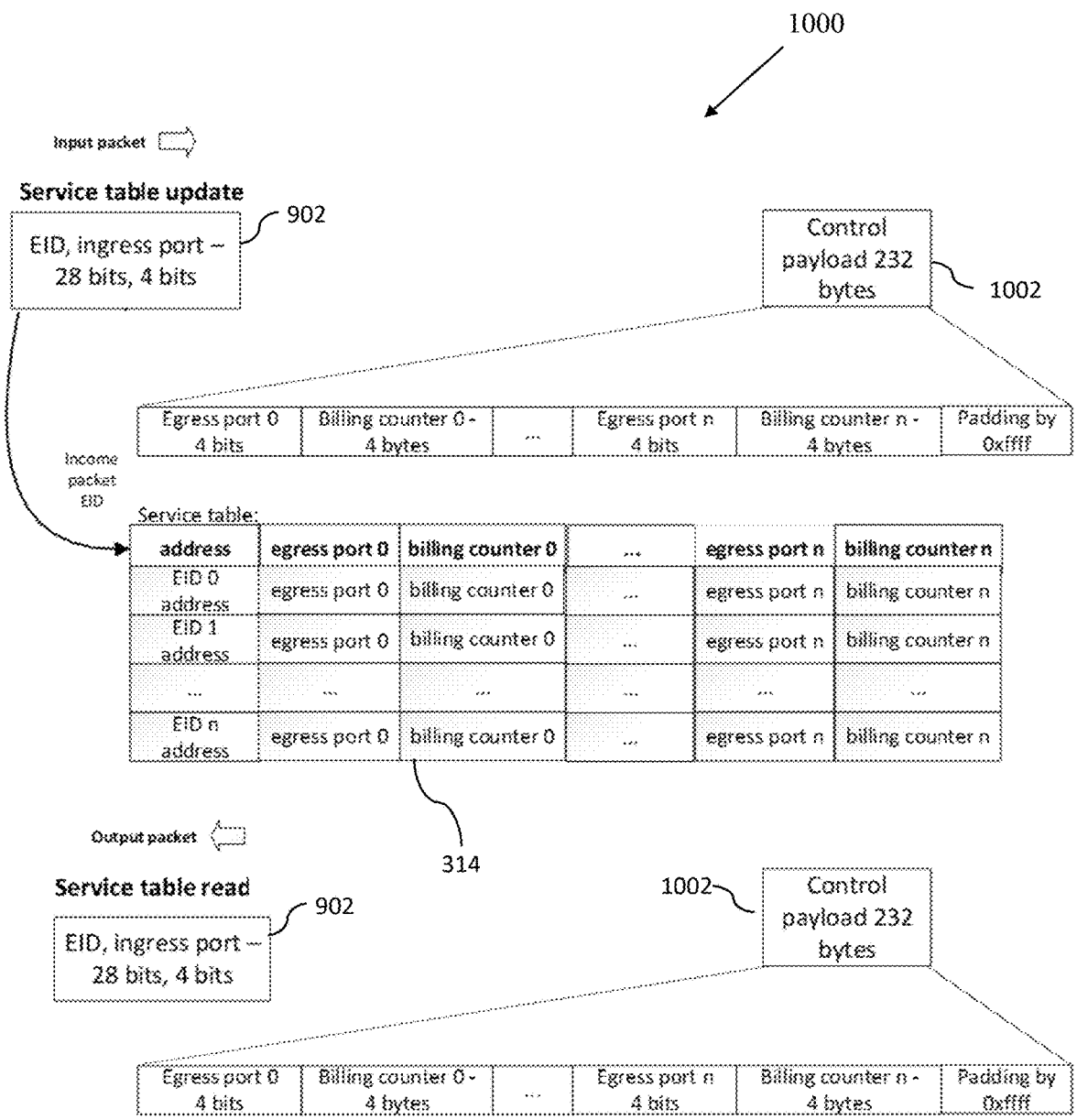

FIG. 10 shows a relationship 1000 between an EID/ingress port field 902 of a typical input control message packet received over an encrypted tunnel and a row of the service table 314. Such a control message may be an instruction to update or read the service or neighbor table. For the update message, the header includes an EID field and may include updates to the billing data for respective "slots," i.e., egress ports of the device receiving the message. The "payload" 1002 of such a message, for example for updating or reading the service table, would include a row of the service table associated with the given EID. When a row of the service table is read, fields of the payload of the output data packet are the same as the fields of the input data packet of an update message. That is, in response to a read message (i.e., read request), the FPGA responds with a control message in the same format as the update message.

Figure 11:
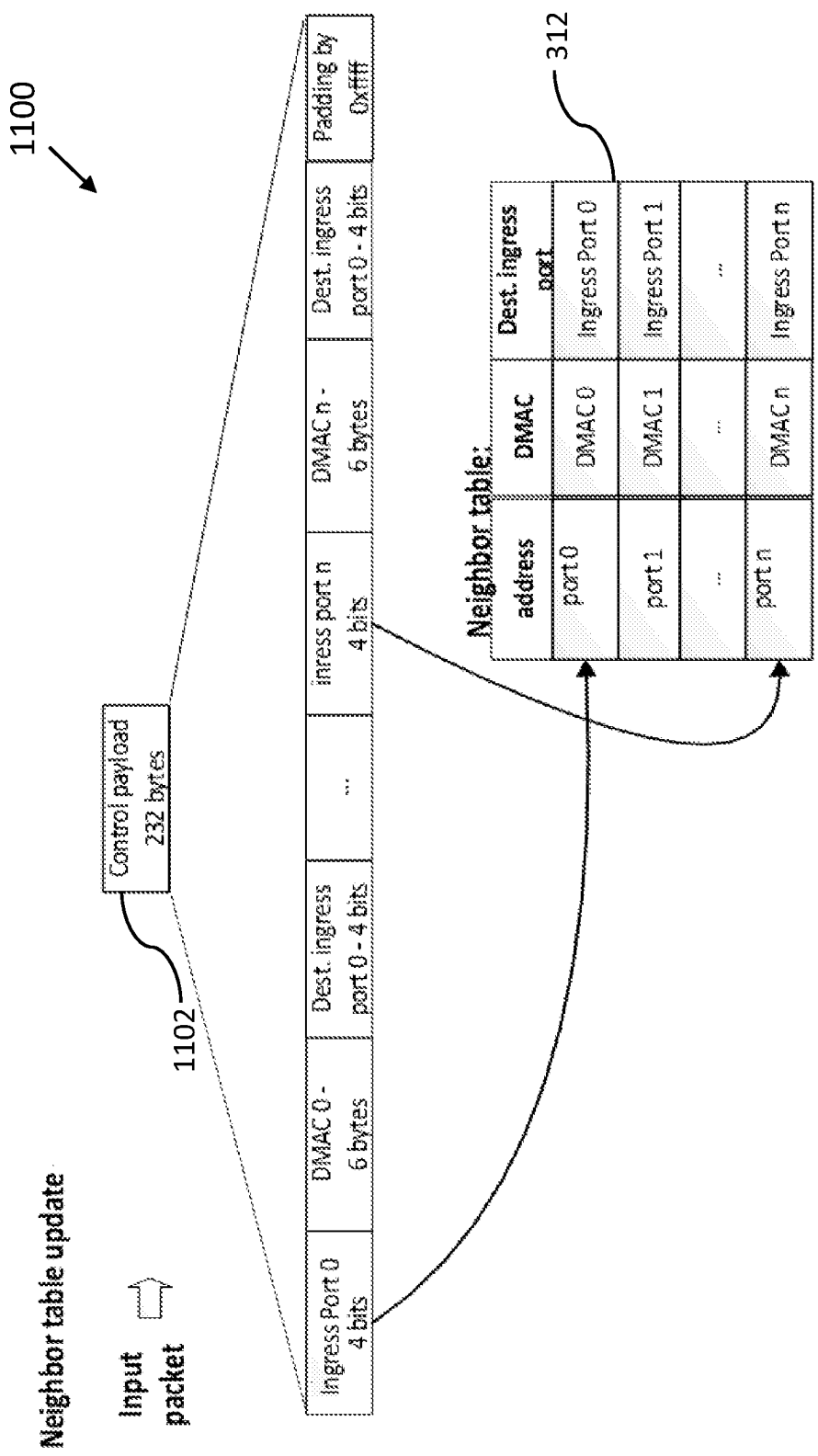

FIG. 11 shows a relationship 1100 between a control payload 1102 of a neighbor table update message and a row of a neighbor table 312. For the update message, the header includes an ingress port field and a respective DMAC field to fill a row of the neighbor table. The payload includes source ingress ports, destination port MACs and destination ingress ports, where the number of source ingress ports depends on the number Ethernet ports per FPGA.

Figure 12:
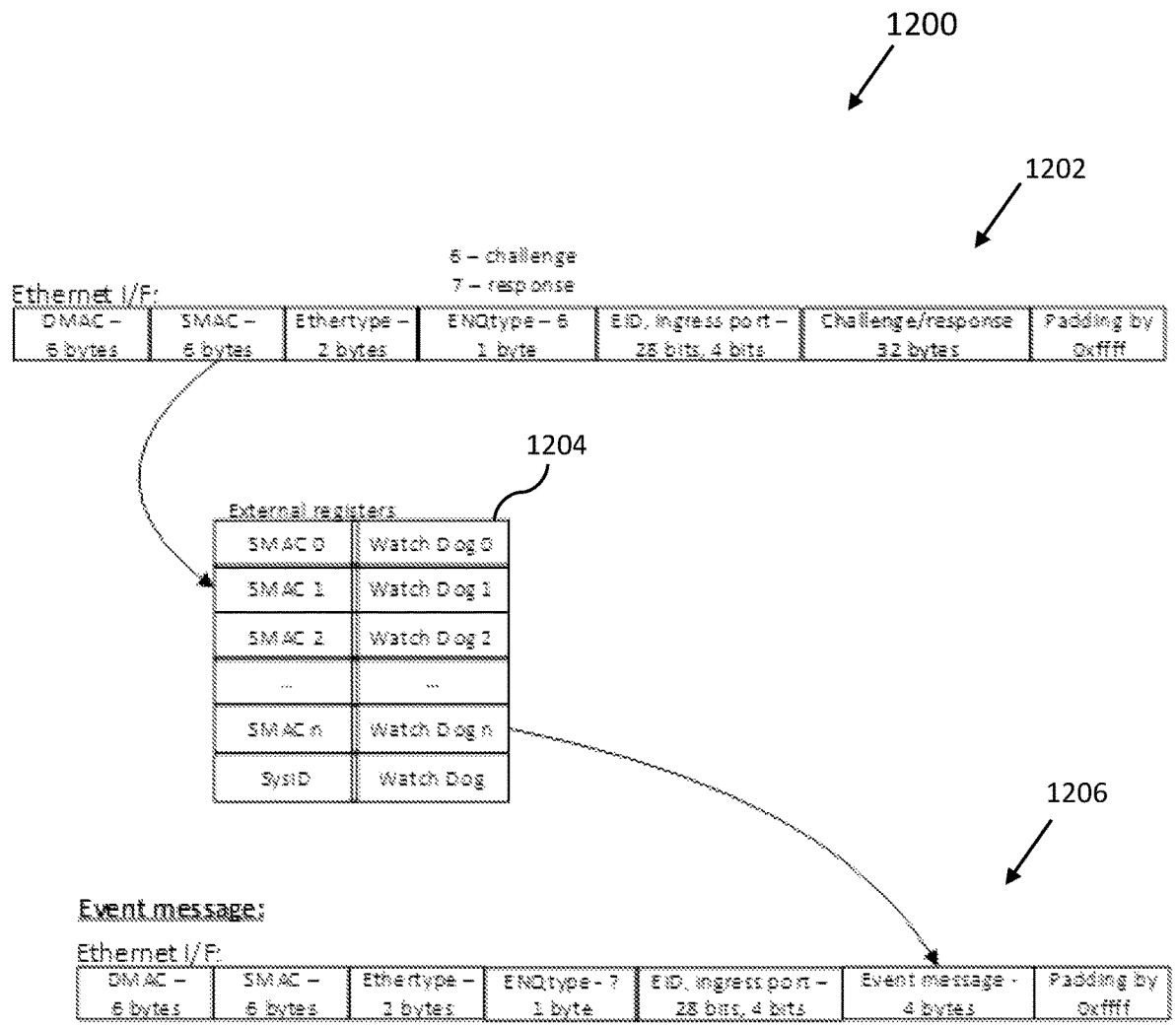

FIG. 12 shows a relationship 1200 between a control packet 1202 of a "keep-alive" master controller message and a register of tamper protection events 1204, also referred to herein as a "watch dog" event register. The example shown is for a message structure of a direct Ethernet message to an FPGA, and the message structure for a PCIe message would have fields to convey the same data, namely the types of tamper events that have been logged. The response message 1206 of the FPGA to the "challenge/response" handshake would include a tamper event, as indicated.

It is also to be understood that the scope of the present invention includes variations and modifications thereof which would occur to persons skilled in the art upon reading the foregoing description and which are not disclosed in the prior art.

APPENDIX 1

Examples of ENQtypes of messages that are communicated between computing devices described above (including the master controller), in some embodiments of the present invention, include the following:

ENQ type 0: USER_DATA_CLEARTEXT—Cleartext ENQ256 packet.
ENQ type 1: USER_DATA_CIPHERTEXT—Encrypted ENQ256 packet.
ENQ type 2: CONTROL_SERVICE_TABLE_WRITE—Service Table update message.

ENQ type 3: CONTROL_SERVICE_TABLE_READ—Service table read request—if the direction is from Master controller to the FPGA, Service table read response—if the direction is from FPGA to the Master controller.

ENQ type 4: CONTROL_NEIGHBOR_TABLE_WRITE—Neighbor table update.

ENQ type 5: CONTROL_NEIGHBOR_TABLE_READ—Neighbor table read request—if the direction is from Master controller to the FPGA, Neighbor table read response—if the direction is from FPGA to the Master controller.

ENQ type 6: TAMPER_CHALLENGE_REQUEST—Tamper protection Challenge request.

ENQ type 7: TAMPER_CHALLENGE_RESPONSE—Tamper protection Challenge response.

ENQ type 8: TAMPER_EVENT_INFORMATION—Tamper protection event Informative.

ENQ type 9: TAMPER_EVENT_WARNING—Tamper protection event—Warning.

ENQ type 10: TAMPER_EVENT_CRITICAL—Tamper protection event—Critical.

ENQ type 13: CONTROL_TEST_MESSAGE—Test message used to verify connectivity.

ENQ type 14: CONTROL_NO_TEST_MESSAGE—Test message expected but not received.

ENQ type 15: CONTROL_TEST_MESSAGE_UNEXPECTED—Test message received unexpectedly.

ENQ type 17: USER_DATA_NVME_WRITE—Cleartext ENQ256 packet bound to the storage media located on the FPGA. NVMe SSDs are located on the FPGA board and can receive data for encrypted storage.

ENQ type 18: USER_DATA_NVME_READ—decrypt the data in an NVMe storage of the FPGA and send accordingly to an egress port.

ENQ type 19: USER_DATA_EEP_CLEARTEXT—endpoint user case, the packet should be encrypted, a new SEED shall be generated in a TRNG seed generator module and inserted to the output packet ENQ256 header, together with the encrypted payload through the M.2 interface of the endpoint FPGA, goes transparently through the site server (because the packet is already encrypted).

ENQ type 20: USER_DATA_EEP_CIPHERTEXT—Enhanced Endpoint traffic is detected and should be transparent for the aggregating device and decrypted on the remote FPGA instance (E2).

ENQ type 22: NETWORK_DISCOVERY—Secure boot—Authentication: Broadcasting "Hello" message of 256 bit, a product of the hash tree method hash function ENQ type 23: NETWORK_ENTRY_OFFER—Secure boot—Authentication: After comparing the "Hello" message to the expected answer, the controller sends a challenge message to the FPGA instance.

ENQ type 24: NETWORK_ENTRY_REQUEST—Secure boot—Authentication: The FPGA instance is getting the challenge from the controller, running the 256 bits through the hash tree method hash function, getting the result as a response to the controller.

ENQ type 25: NETWORK_AUTH_START—Secure boot—Activation: After getting the response from the FPGA instance, the controller sends a health check request.

ENQ type 26: INST_HEALTH_CHECK—Secure boot—Activation: Sending FPGA status report.

ENQ type 27: NETWORK_ENTRY_PERMIT—Secure boot—Activation: The FPGA instance getting an "Approved Entry" message, getting ready for receiving the bitstream.

ENQ type 28: NETWORK_ENTRY_PARAMS—Secure boot—Activation: Sending to the FPGA instance chunks of the bitstream encrypted by the installed cipher engine. The FPGA instance decrypts the bitstream and sends it to flash memory of the FPGA. In the FSRAM, the bitstream file, which may include Xilinx encryption, is set to the FPGA PLBs after resetting the board.

ENQ type 29: NETWORK_ENTRY_READY—Secure boot—Activation: The FPGA instance sends a "Ready" message to the controller after setting the updated HW version and erasing the flash.

ENQ type 30: NETWORK_ENTRY_SUCCESS—Secure boot—Activation: The FPGA instance is authorized, activation complete, waiting for Service Table update.

ENQ type 34: NETWORK_ESTABLISHMENT_REQUEST—Network establishment request message, from the SW Agent to the Master Controller.

ENQ type 35: NETWORK_ESTABLISHMENT_START—Network establishment start message from the Master controller to the SW Agent.

ENQ type 36: NETWORK_ESTABLISHMENT_COMPLETE—Network establishment complete message from the Master controller to the SW Agent.

The invention claimed is:

1. A method for encrypted communications, comprising:
receiving at a first field programmable gate array (FPGA) and at a second FPGA, from a master controller, respective encrypted bitstreams of encryption firmware;
decrypting the encrypted bitstreams within the first and second FPGAs and loading the resulting encryption firmware to programmable logic blocks (PLBs) of the first and second FPGAs;
executing at the first FPGA steps of:
receiving an unencrypted data payload;
generating a random seed value;
generating a hash key from parameters that include the random seed value and a value representing an encrypted channel ID (EID) of a network communications channel between the first and second FPGAs, by applying the encryption firmware, wherein a size of the hash key equals is the given size of the unencrypted data payload;
XORing the hash key with the unencrypted data payload to generate an encrypted data payload;
assembling an encrypted data packet including the seed and the encrypted data payload and sending the encrypted data packet to the second FPGA over the network communications channel identified by the EID; and
executing at the second FPGA further steps of:
receiving the encrypted data packet with the seed and the encrypted data payload;
generating the hash key from the parameters including the seed value and the EID value, by applying the encryption firmware;
XORing the hash key with the encrypted data payload to regenerate the unencrypted data payload; and
delivering the unencrypted data payload from the second FPGA to a target address.

2. The method of claim 1, further comprising receiving at the first and at the second FPGAs, from the master controller during a channel establishment process, respective control messages specifying the EID value of the network communications channel.

3. The method of claim 2, wherein, after the channel establishment process, the first FPGA receives the unencrypted data payload together with an EID field, and wherein the first FPGA first confirms that the value of the EID field matches the EID value previously received during the channel establishment process before generating the hash key.

4. The method of claim 3, wherein if the EID field value does not match the previously received EID value, the first FPGA issues an error message to the master controller instead of generating the hash key.

5. The method of claim 1, wherein sending the encrypted data packet to the second FPGA comprises sending the encrypted data packet from an Ethernet port of the first FPGA, wherein the network communications channel is a virtual private network (VPN), and wherein the first and second FPGAs operate in different local area network (LAN) domains.

6. The method of claim 1, further comprising prior to receiving the encrypted bitstreams, authenticating the first and the second FPGAs by the master controller by encrypted authentication handshakes.

7. The method of claim 1, further comprising testing for tamper events at one or more of the first FPGA, the second FPGA and at associated respective computing devices in which the first and second FPGAs are installed, and notifying the master controller of such tamper events, wherein such tamper events include one or more of the following: FPGA debugging attempts, hardware changes to the computing device, or malformed input data packets.

8. The method of claim 7, further comprising shutting down or resetting one or both of the first and second FPGAs when a tamper event is identified, wherein such a tamper event includes one or more of the following: an FPGA debugging attempt, a hardware change to an FPGA-associated computing device, or a malformed input data packet.

9. The method of claim 1, wherein generating the cryptographic hash key comprises creating a series of matrices from the random seed value, performing matrix operations on each of the matrices according to the EID, concatenating the matrices into a bit string, and cutting the bit string to the bit size of the unencrypted data payload.

10. A system for encrypted communications, wherein the system comprises a master controller and two or more field programmable gate arrays (FPGAs),
wherein the two or more FPGAs are each configured to receive from the master controller an encrypted bitstream of encryption firmware, to decrypt the encryption firmware and to load the encryption firmware to programmable logic blocks (PLBs);
wherein the two or more FPGAs are further configured for encrypting data payloads by:
receiving an unencrypted data payload;
generating a random seed value;
applying a hash function to generate a cryptographic hash key from parameters, including the random seed value and an encrypted channel ID (EID) value of a network communications channel between the first and second FPGAs, by applying the encryption firmware, wherein the hash key has a bit size that equals the bit size of the unencrypted data payload;
XORing the encryption hash key with the unencrypted data payload to generate an encrypted data payload;
assembling an encrypted data packet including the seed and the encrypted data payload and sending the encrypted data packet to a second of the at least two FPGAs over the network communications channel identified by the EID value; and
wherein the two or more FPGAs are further configured for decrypting encrypted data payloads by:
receiving from another of the at least two FPGAs an encrypted data packet with a seed value and an encrypted data payload;
generating from the seed value and the EID value, by applying the encryption firmware, a decryption hash key;
XORing the decryption hash key with the encrypted data payload to regenerate an unencrypted data payload; and
delivering the unencrypted data payload to a target address.

11. The system of claim 10, wherein the two or more FPGAs are further configured to receive, from the master controller, during a channel establishment process, respective control messages specifying the EID value of the network communications channel.

12. The system of claim 11, wherein each FPGA is configured to receive, after the channel establishment process, the unencrypted data payload together with an EID field and to confirm, before generating the hash key, that the value of the EID field matches the EID value previously received during the channel establishment process.

13. The system of claim 12, wherein each FPGA is further configured to issue an error message to the master controller instead of generating the hash key if the EID field does not match the EID value.

14. The system of claim 10, wherein sending the encrypted data packet to the second FPGA comprises sending the encrypted data packet from an Ethernet port of the first FPGA, wherein the network communications channel is a virtual private network (VPN), and wherein the first and second FPGAs operate in different local area network (LAN) domains.

15. The system of claim 10, wherein the master controller is further configured to authenticate the two or more FPGAs by encrypted authentication handshakes.

16. The system of claim 10, wherein the two or more FPGAs are further configured to test for tamper events and to notify the master controller of such tamper events, wherein such tamper events include one or more of the following: FPGA debugging attempts, hardware changes to the computing device, or malformed input data packets.

17. The system of claim 16, wherein the two or more FPGAs are further configured to shut down or reset when a tamper event is identified.

18. The system of claim 16, wherein configuring the two or more FPGAs to generate the cryptographic hash key comprises creating a series of matrices from the random seed value, performing matrix operations on each of the matrices according to the EID, concatenating the matrices into a bit string, and cutting the bit string to the bit size of the unencrypted data payload.

* * * * *